Sept. 24, 1963 C. J. WEIDKNECHT ETAL 3,105,205
PHASE MODULATOR
Filed Sept. 22, 1960
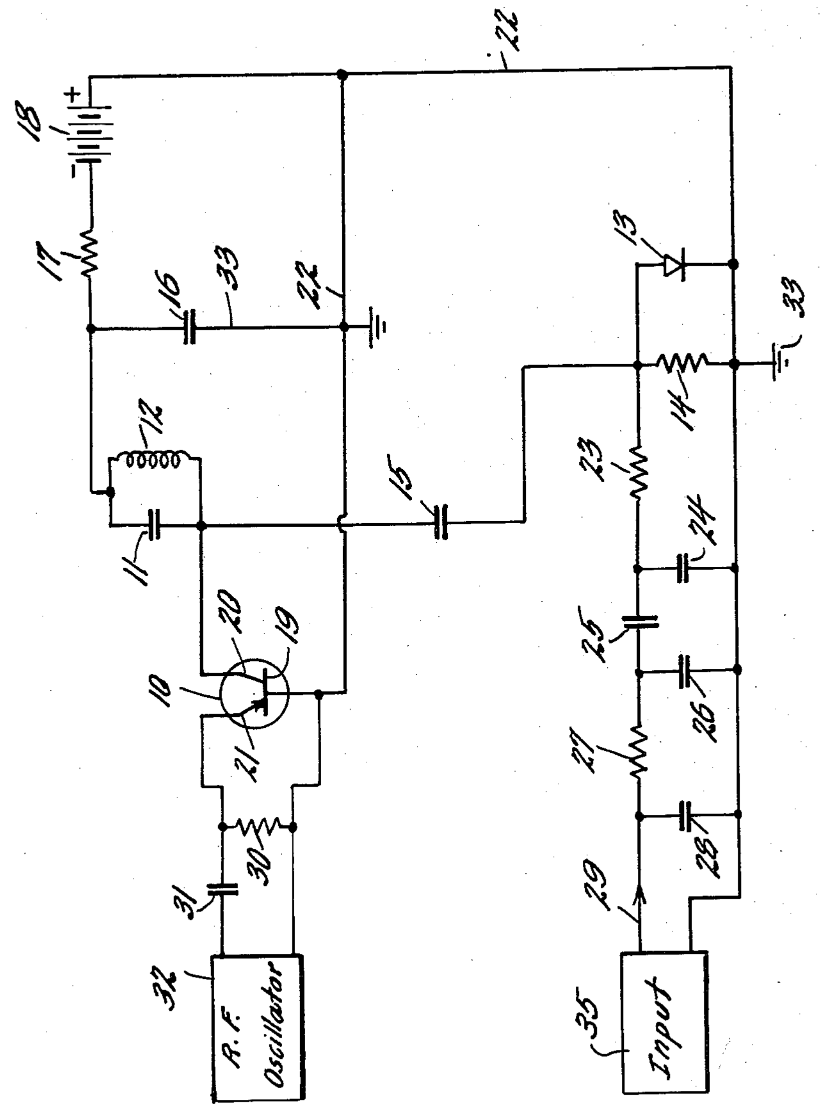
INVENTORS
Charles J. Weidknecht
Charles Rosen
BY Paris Haskell & Levine
ATTORNEYS

United States Patent Office 3,105,205
Patented Sept. 24, 1963

3,105,205
PHASE MODULATOR

Charles J. Weidknecht, Willow Grove, and Charles Rosen, Philadelphia, Pa., assignors to Vector Manufacturing Company, a corporation of Pennsylvania Filed Sept. 22, 1960, Ser. No. 57,768
9 Claims. (Cl. 332—30)

This invention generally relates to improvements in radio frequency phase modulators and is particularly concerned with providing a phase modulator having a minimum number of miniature components yet possessing improved linearity and wider range of phase deviation as desired for applications such as missile and aircraft telemetering of information.

It is accordingly a principal object of the invention to provide a phase modulator having improved modulation linearity and wide range phase deviation.

A further object is to provide such a modulator comprised exclusively of solid state components possessing improved dependability and ruggedness over electron tube circuits.

Still another object is to provide such a modulator having extremely low power consumption.

A still further object is to provide such a modulator occupying a minimum of space and being lightweight while being constructed from readily available and low cost components.

Other objects and many additional advantages will be more readily apparent to those skilled in the art after a detailed consideration of the following specification taken with the accompanying drawing, and illustrating in electrical schematic form, one preferred embodiment of the invention.

Referring now to the drawing, the preferred modulator circuit generally comprises a transistor 10, a tuned resonant circuit including a parallel connected capacitor 11 and inductor 12, and a voltage variable capacitor-diode 13. The voltage variable capacitor-diode 13 has its lower terminal grounded at 33 and its upper terminal connected through direct current blocking and alternating current transmission bypass capacitor 15 to one junction of the resonant circuit, comprised of elements 11 and 12, whose other junction is likewise grounded through a bypass capacitor 16. Consequently, the voltage variable capacitor-diode 13 is effectively in parallel circuit connection with the resonant circuit and any variation of its capacitance serves to vary the resonant frequency of the tuned circuit.

A radio frequency carrier signal to be phase modulated is introduced by a carrier oscillator 32 and thence transmitted through a coupling capacitor 31 and resistor 30 across the emitter electrode 21 and base 19 electrode of the transistor 10. The transistor 10 is connected in a common base configuration and accordingly the oscillator carrier signal is transmitted across the base electrode 19 and the collector electrode 20 of the transistor 10 and thence is developed across the resonant circuit, comprised of capacitor 11, inductor 12, and voltage variable capacitor-diode 13.

A direct current source of potential 18 is applied across the collector and base electrodes of transistor 10 in series with a current limiting resistor 17 and with the parallel connected capacitor 11 and inductor 12. The positive terminal of source 18 is directly connected to the base 19 of transistor 10 over line 22, and over the same line 22 is connected to one terminal of the capacitor diode 13, which is grounded at 33.

For varying the phase of this carrier signal according to the amplitude of a modulating signal, means are provided for varying the capacity of the capacitor-diode 13 according to the modulating signal whereby the resonant frequency of the tank circuit is varied. In other words, the tank circuit is detuned from the frequency of the carrier 32 to present either a capacitive or an inductive load at the carrier frequency serving to change the phase of the voltage across the tank circuit according to the changes in capacity of the voltage variable capacitor-diode 13.

For varying the capacity of the capacitor-diode 13, the modulating signal is introduced over line 29 from a suitable generator 35, labeled "input" and thence passes through a low-pass filter circuit comprised exclusively of capacitor and resistor elements to appear across the voltage variable diode 13. Variations of the amplitude of the input modulating signal on line 29, therefore, produce a low frequency change of voltage across capacitor-diode 13, thereby varying its capacity in direct proportion to the amplitude variations of the input modulating signal.

The low-pass filter network interconnecting the modulating signal with the voltage variable capacitor-diode 13 permits the lower frequency of the modulating input signal to be applied across the diode 13 but prevents any backward transmission of the high frequency carrier signal from the oscillator 32 from being directed through bypass capacitor 15 and backwardly to the input modulating signal source.

More specifically, the carrier bypass capacitor 15 presents a low impedance to the radio frequency carrier signal and permits the carrier signal to pass downwardly and be applied across the voltage variable capacitor 13 in parallel with the resonant tank circuit elements 11 and 12. However, the series connected resistors 23 and 27 in conjunction with the high frequency bypass capacitors 24, 26, and 28; all being in the network between the voltage variable capacitor 13 and the input modulating signal source provide a high impedance preventing the carrier signal from passing backwardly to the input modulating signal source, whereby the carrier signal is effectively blocked from passing to the modulator signal source. Consequently, insofar as the higher frequency carrier wave is concerned, the circuit appears as a capacitor-diode 13 being shunted by the capacitor 11 and inductance 12 of the tank circuit, and the resistor 14.

On the other hand, the alternating current bypass capacitor 15, in circuit between the voltage variable capacitor-diode 13 and the tank circuit elements 11 and 12, provides a high impedance for blocking the lower frequency modulating signal from passing upwardly to the tank circuit elements 11 and 12. Thus, the radio frequency carrier signal originating from oscillator 32 is decoupled from the modulating input signal source but appears across the voltage variable capacitor-diode 13 and the tank circuits 11 and 12, whereas the input modulating signal also appears across the voltage variable capacitor-diode 13 but is decoupled from the radio frequency carrier circuit and the tank circuits 11 and 12 by the action of blocking capacitor 15.

In operation, the tank circuit elements 11 and 12 and the voltage variable capacitor-diode 13 are initially tuned in resonance with the carrier frequency oscillator 32 and effectively provide a resistance load across the carrier oscillator 32. Consequently, in the absence of modulation, the signal appearing across the tank circuit is in phase with the carrier signal produced by the radio frequency oscillator 32. When a modulation signal voltage is applied across the voltage variable capacitor-diode 13, the capacity of diode 13 is accordingly varied and the load circuit is detuned slightly above and below the operating frequency of the carrier to produce a leading or lagging voltage across the tank circuit, thereby producing phase modulation of the radio frequency carrier signal in proportion to the amplitude of the modulating signal. Voltage variable capacitor-diodes, such as 13, are available having a wide range of reactance variation in linear proportion to an energizing signal, and consequently, the phase modulation circuit according to the invention provides improved modulation linearity and greater phase deviation than is obtainable by means of other known circuitry. As is believed evident to those skilled in the art, an output signal may be taken from the circuit by a winding (not shown) that is inductively coupled to the inductor 12 in the tank circuit, or alternatively, an output signal may be taken from the junction of resistor 17 and capacitor 16.

Although but one preferred embodiment of the invention has been illustrated and described, it is believed evident that many variations may be made without departing from the spirit and scope of the invention. Consequently, this invention is to be considered as being limited only according to the following claims hereto.

What is claimed is:

1. A phase modulator comprising a transistor and tuned circuit energized thereby, said tuned circuit including a capacitor and an inductance, a voltage sensitive capacitor diode connected to said tuned circuit and said tuned circuit and voltage sensitive diode normally being resonant at a selected carrier frequency, means introducing a fixed carrier frequency signal to energize said transistor, a decoupling circuit responsive to a lower frequency modulating signal to provide a varying voltage across said voltage sensitive diode thereby to change the capacitive reactance thereof in proportion to said modulating signal and vary the resonant frequency of the combined tuned circuit and diode, and a capacitor in a series connection between the diode and tuned circuit for preventing the lower frequency modulating signal from energizing said tuned circuit.

2. In the modulator of claim 1, said decoupling circuit including a low pass resistor-capacitor filter for decoupling said carrier frequency from said modulating signal.

3. In the modulator of claim 2, said resistance capacitance network impedance matching said voltage sensitive diode to said modulating signal.

4. In the modulator of claim 1, said transistor having base, emitter and collector elements in a common base configuration, means introducing said carrier frequency between the emitter and base elements thereof and means connecting said tuned circuit in the collector base circuit thereof.

5. In a phase modulator circuit comprising a buffer stage energizing a tuned circuit, said buffer stage being in turn energizable by a fixed frequency carrier signal and said tuned circuit including a capacitor and inductance, a voltage controlled variable capacitor means connected to said tuned circuit, said tuned circuit and voltage variable capacitor normally being resonant at said carrier frequency to provide an output signal from the tuned circuit normally in phase with said carrier signal, means for introducing a variable amplitude modulating voltage at lower frequency than the carrier signal to vary the capacitance of said voltage controlled variable capacitance means and thereby detune said tuned circuit in proportion thereto, a low frequency decoupling circuit including a capacitor interconnecting said voltage controlled variable capacitance means and said tuned circuit to prevent said modulating voltage from being introduced into said tuned circuit, and a high frequency decoupling means including a resistor-capacitor network in said introducing means for preventing said carrier frequency signal from being directed through said introducing means.

6. In a phase modulator having a tuned circuit including a capacitance and inductance energizable by a fixed frequency carrier signal, a voltage controlled variable capacitance, a high frequency coupling circuit including a capacitor interconnecting said tuned circuit and said voltage variable capacitance, a low frequency coupling circuit energizable by a lower frequency source of modulating voltage for energizing said voltage variable capacitance, to vary the capacity thereof according to amplitude variations of the modulating voltage, said high frequency coupling circuit substantially blocking the passage of the lower frequency modulating voltage from said tuned circuit, and said low frequency coupling circuit blocking the passage of said carrier signal from said modulating voltage source.

7. In the phase modulator of claim 6, a transistor having base, collector, and emitter electrodes, and means connecting said transistor in a common base configuration intermediate said carrier signal source and said tuned circuit.

8. In the phase modulator of claim 7, said tuned circuit being connected in series circuit relationship with the emitter and collector electrodes of said transistor, and said voltage controlled variable capacitance being connected in circuit between said collector and base electrodes of said transistor.

9. In the phase modulator of claim 8, said high frequency coupling circuit comprising a capacitor having a low impedance at the carrier frequency and a high impedance at the modulating voltage frequency.

References Cited in the file of this patent

UNITED STATES PATENTS

| | | |
|---|---|---|
| 2,559,023 | McCoy | July 3, 1951 |
| 2,771,584 | Thomas | Nov. 20, 1956 |
| 3,020,493 | Carroll | Feb. 6, 1962 |
| 3,021,492 | Kaufman | Feb. 13, 1962 |
| 3,046,496 | Trevor | July 24, 1962 |

OTHER REFERENCES

Electronics Industries, pages 77–80, July 1958.